United States Patent
Davis et al.

(10) Patent No.: US 8,616,622 B2
(45) Date of Patent: Dec. 31, 2013

(54) ENERGY MANAGEMENT HOOD BUMPER

(75) Inventors: David J. Davis, Rochester, MI (US); Larry J. Wilson, Commerce Township, MI (US)

(73) Assignee: MacLean Fogg Company, Mundelein, IL (US)

(\*) Notice: Subject to any disclaimer, the term of this patent is extended or adjusted under 35 U.S.C. 154(b) by 0 days.

(21) Appl. No.: 13/547,254

(22) Filed: Jul. 12, 2012

(65) Prior Publication Data

US 2013/0026785 A1    Jan. 31, 2013

Related U.S. Application Data

(60) Provisional application No. 61/512,726, filed on Jul. 28, 2011.

(51) Int. Cl.
*B60N 99/00* (2006.01)

(52) U.S. Cl.
USPC ............... 296/193.11; 296/187.04; 180/69.2

(58) Field of Classification Search
USPC ................. 24/297, 453; 180/69.2, 69.23; 296/136.02, 187.03, 187.04, 193.11, 296/207; 411/392, 395, 396, 417
See application file for complete search history.

(56) References Cited

U.S. PATENT DOCUMENTS

| | | |
|---|---|---|
| 4,653,968 A | 3/1987 | Rapata et al. |
| 5,419,539 A | 5/1995 | Bressler |
| 5,482,348 A | 1/1996 | Mass et al. |
| 5,735,511 A | 4/1998 | Stöcker et al. |
| 5,765,882 A | 6/1998 | Trauscht et al. |
| 6,039,388 A | 3/2000 | Choi |
| 6,088,878 A | 7/2000 | Antonucci et al. |
| 6,119,306 A | 9/2000 | Antonucci et al. |
| 6,507,976 B2 | 1/2003 | Ichimaru |
| 7,114,217 B2 | 10/2006 | Matsuzawa et al. |
| 7,618,088 B2 | 11/2009 | Bauer |
| 7,690,722 B2 | 4/2010 | Boggess |

FOREIGN PATENT DOCUMENTS

| | | |
|---|---|---|
| DE | 102005012774 A1 | 9/2006 |
| DE | 102006057046 B3 | 2/2008 |
| WO | WO 2004/083020 A2 | 9/2004 |

OTHER PUBLICATIONS

Search Report for related application No. PCT/US2012/046697 filed Jul. 13, 2012; Mailed Sep. 28, 2012.

*Primary Examiner* — Lori Lyjak

(74) *Attorney, Agent, or Firm* — Brinks Gilson and Lione

(57) ABSTRACT

A hood bumper assembly for automotive vehicle hoods is provided that can manage impact energy from a collision with a pedestrian. The hood bumper assembly may have a bumper with a cushion that is threaded to a retainer attached to the vehicle frame. The threaded engagement between the bumper and the retainer may have a percentage of thread engagement that is less than industry standards so that the threads skip without substantially deforming when an impact load is applied to the vehicle hood.

20 Claims, 5 Drawing Sheets

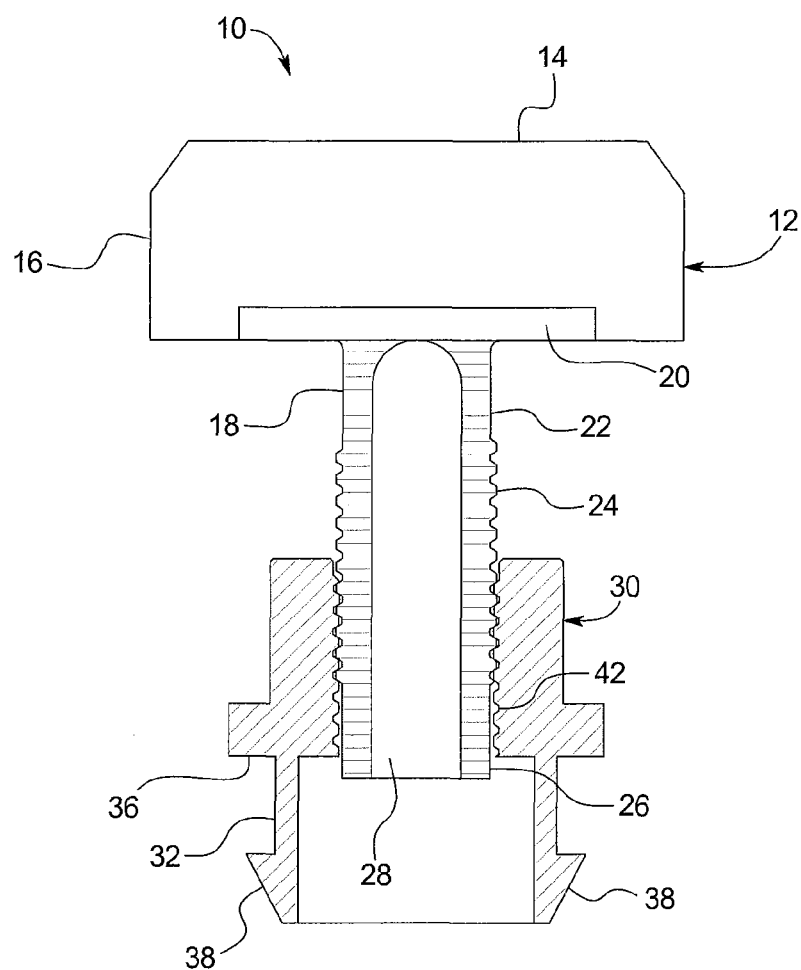

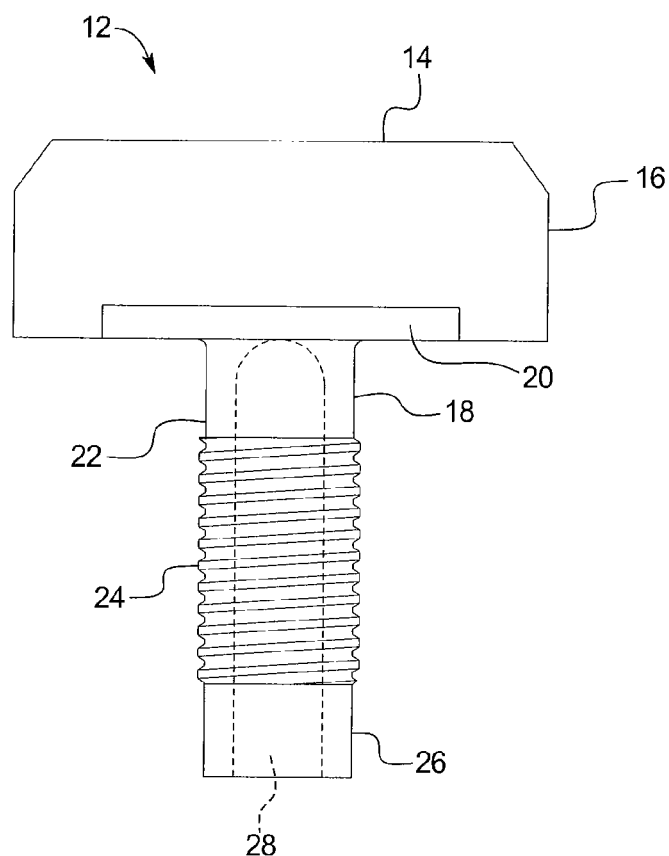

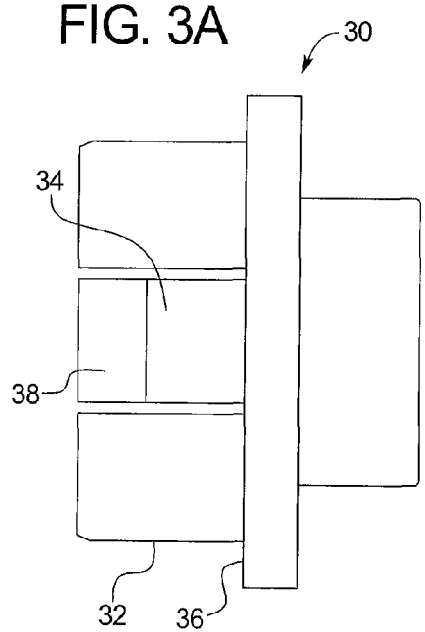
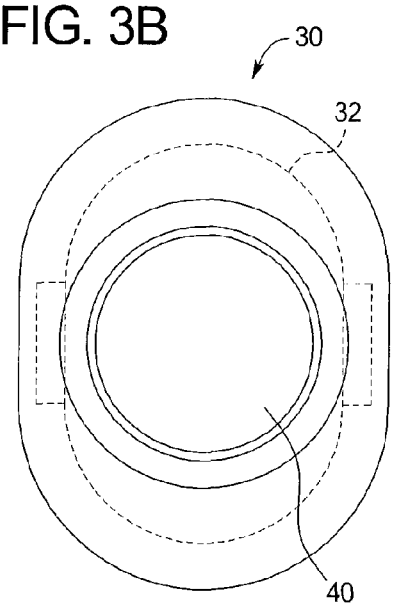
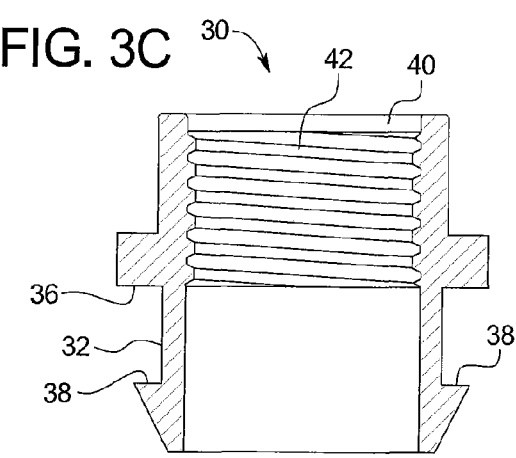

ENERGY MANAGEMENT HOOD BUMPER

This application claims priority to U.S. Provisional Application No. 61/512,726, filed Jul. 28, 2011, which is hereby incorporated by reference herein.

BACKGROUND

The present invention relates generally to hood bumpers for automotive vehicles, and more particularly, to a hood bumper that manages energy from impacts to the vehicle hood.

Typically, hood bumper assemblies are mounted in an automotive vehicle between the frame of the vehicle and the bottom surface of a front portion of the vehicle hood. The primary purpose of hood bumper assemblies is to provide a support surface for the hood when it is closed. However, due to manufacturing tolerances in the assembly of an automotive vehicle, it is usually difficult for the automotive manufacturer to precisely predict where a particular hood will line up properly to particular vehicle fenders. In other words, while it is desirable for a closed vehicle hood to vertically line up with the surrounding body panels for pleasing aesthetics and for the hood to close at a particular height for the locking mechanism, the preferred vertical spacing between the hood and frame typically varies from vehicle to vehicle. Conventional hood bumpers solve this problem by providing various adjustable features that adjust the height of the top of the bumper assembly, and thus, the height of the vehicle hood relative to the vehicle frame. One example of an adjustable feature that may be used is a threaded engagement between various components of a bumper assembly.

Vehicle manufacturers and transportation regulators, however, are frequently concerned about the safety of automotive vehicles. One safety concern that has been expressed is that in highly dense communities, collisions between automotive vehicles and pedestrians can result in severe injuries to pedestrians who are hit by moving vehicles. One of the most common types of collisions between an automotive vehicle and a pedestrian involves the vehicle driving forward into a walking pedestrian so that the pedestrian falls onto and is hit by the hood of the vehicle. In these situations, a substantial portion of the moving vehicle's energy is transmitted to the pedestrian. In other words, while the vehicle may not suffer much damage, the pedestrian experiences the full force of the impact and can be severely injured.

Therefore, it would be desirable if automotive vehicles were equipped with a system that minimized the injury to pedestrians when collisions occur between vehicles and pedestrians. One area for improvement would be a vehicle hood arrangement that manages some of the impact energy during a collision instead of transmitting most of the impact energy to the pedestrian. This improvement might be possible by designing a hood bumper assembly that changes the height of the vehicle hood in a controlled manner during a collision to absorb energy. However, the majority of conventional hood bumper assemblies are not capable of substantially changing height or managing significant energy during an impact. In particular, the adjustable height features in most hood bumper assemblies are generally solid connections in use and cannot change height substantially when a direct force is applied to the hood. For example, while a conventional threaded connection in a bumper assembly can be used to adjust the height of a vehicle hood during manufacturing or later during an intentional adjustment by turning the threaded components relative to each other, a direct vertical load to the threaded connection will not cause any change in height of the bumper assembly. Thus, while conventional bumper assemblies can be intentionally adjusted in height, conventional bumper assemblies do not change height during an impact to absorb energy.

Accordingly, the inventors believe it would be desirable to provide a new vehicle hood bumper assembly that could change height in a controlled manner during a collision to absorb and manage the impact energy.

SUMMARY

A hood bumper assembly is described for automotive vehicle hoods. The hood bumper assembly has a threaded engagement that skips when an impact load is applied to the hood. As a result, the vehicle hood moves below its predetermined height toward the vehicle frame. The controlled skipping of the threads and movement of the hood manages energy during a collision to minimize damage to an object that hits the hood during the collision, such as a pedestrian. The inventions herein may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which:

FIG. 1 is a side cross-sectional view of a hood bumper assembly;

FIG. 2 is a side view of a bumper;

FIG. 3A is a side view of a retainer;

FIG. 3B is a top view of the retainer;

FIG. 3C is a cross-sectional view of the retainer;

DETAILED DESCRIPTION

Figure 4:
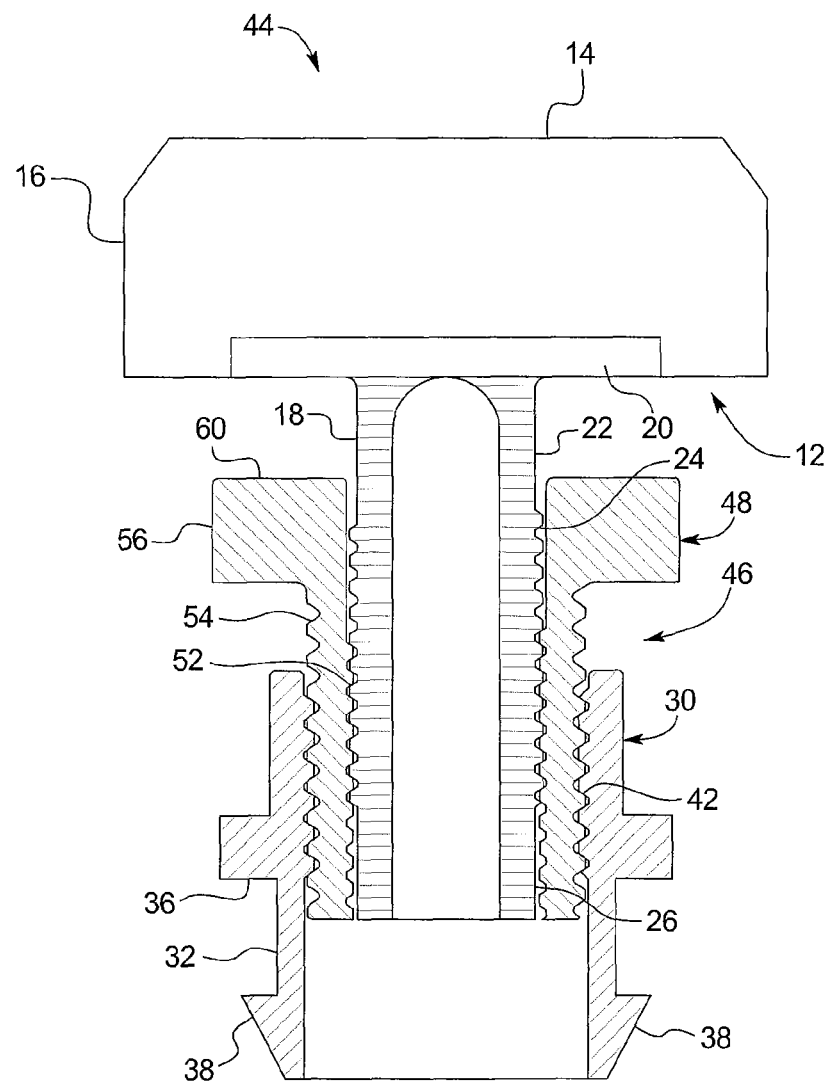
FIG. 4 is a side cross-sectional view of another hood bumper assembly.
Figure 5A:
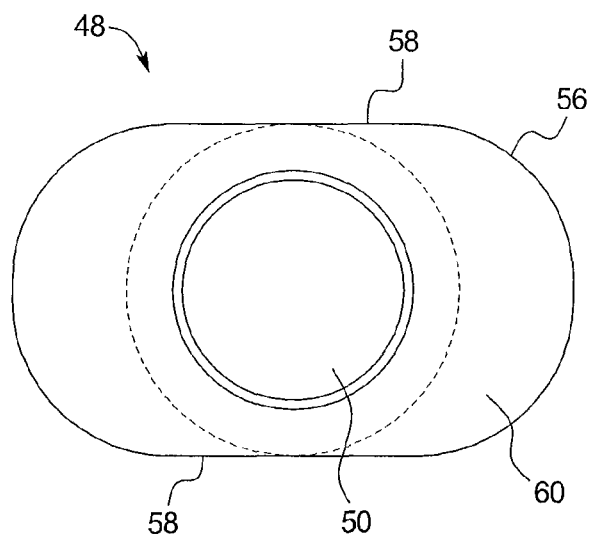
FIG. 5A is a top view of an inner sleeve.
Figure 5B:
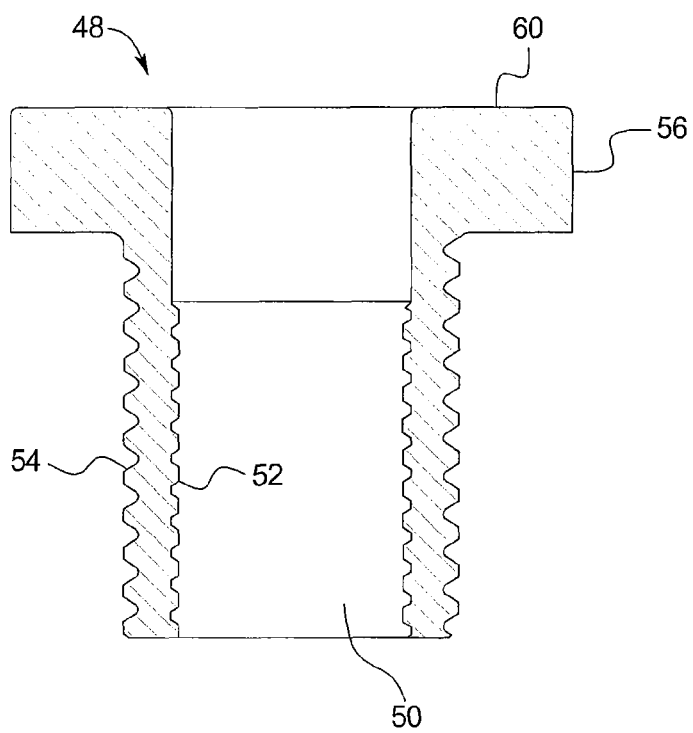
FIG. 5B is a cross-sectional view of the inner sleeve.

Referring now to the figures, and particularly to FIGS. 1-3C, one embodiment of the hood bumper assembly 10 is shown. The bumper assembly 10 includes a bumper 12 that is designed to contact the bottom surface of an automotive vehicle hood to support the vehicle hood at a set height. Preferably, the top surface 14 of the bumper 12 is provided with a soft elastomeric material 16 which cushions the contact between the hood and the bumper 12 when the hood is closed. The cushion 16 may be attached to the body 18 of the bumper 12 with adhesives or with an interference fit. The body 18 of the bumper 12 is preferably made from a plastic polymer material. The body 18 may have a flange 20 or other widened structure at the top of the body 18 to attach the cushion 16 to the body 18. The body 18 may also include a post 22 extending downward from the cushion 16. Preferably, the post 22 is provided with external threads 24 extending along at least a portion of the post 22. If desired, the bottom portion 26 of the post 22 may have an unthreaded section 26 which may be used as a guide to begin the threaded connection between the bumper 12 and the retainer 30. The post 22 may also have a hollow interior cavity 28 extending axially through the post 22 from the bottom end to near the upper flange 20.

The retainer 30 is designed to be attached to a vehicle frame. In the embodiment of FIG. 1, the retainer 30 may be a single member threadably engaged directly with the bumper 12. However, the retainer 30 and/or the bumper 12 may also be made of multiple components. For example, as described below in conjunction with FIG. 4, an inner sleeve 48 may be positioned between the retainer 30 and the bumper 12 and may be considered to be a component of the retainer or a component of the bumper. Preferably, the single member retainer 30 is made from a plastic polymer material. In order to attach the retainer 30 to the vehicle frame, the retainer 30 may have a bottom extension 32 with an oblong or other shape that slides into a hole in the vehicle frame. The bottom extension 32 may also have elastic snaps 34 that deflect inward when the bottom extension 32 is pushed through the frame hole. Once the bottom extension 32 has been pushed through the frame hole, the top surface of the frame abuts against a flange surface 36 on the retainer 30, and the snaps 34 return to the state shown FIG. 3C so that the teeth 38 on the snaps 34 trap a bottom surface of the frame. The retainer 30 may also have an axial opening 40 extending through the retainer 30. Internal threads 42 may be provided along the opening 40 for threadable engagement with the threads 24 on the bumper 12.

As shown FIG. 1, the height of the top surface 14 of the bumper 12 may be adjusted by rotating the bumper 12 relative to the retainer 30. This causes the threads 24, 42 of the bumper 12 and the retainer 30 to drive the post 22 of the bumper 12 to move upward or downward through the opening 40 in the retainer 30, depending on the direction of rotation. While this type of height adjustment may be conventional for hood bumper assemblies in general, the hood bumper assembly 10 described herein has a reduced percentage of engagement between the threads 24, 42 compared to industry standards. For example, industry standards for percentage of engagement typically require 60% or 70% of thread engagement. This level of thread engagement in industry standards is designed to ensure that threaded connections can withstand axial loads without deforming or shearing threads. In other words, percentage of threaded engagement defined by industry standards are designed to prevent threadably engaged components from moving axially relative to each other when axial loads are applied to the components. Thus, conventional threaded connections are axially locked and generally do not respond axial loads.

In contrast to conventional threaded connections, the threads 24, 42 of the bumper 12 and the retainer 30 have a percentage of thread engagement that is less than industry standards. For example, the percentage of threaded engagement between the bumper thread 24 and the retainer thread 42 is preferably about 30% to about 50%. This may be accomplished by reducing the major diameter of the external thread 24 or by increasing the minor diameter of the internal thread 42. As a result, when a sufficient axial load is applied to the bumper assembly 10, the bumper thread 24 and retainer thread 42 may skip past each other without substantially deforming the threads 24, 42. This may be useful in managing impact loads resulting from a pedestrian collision, since the vehicle hood may drop below its adjusted height due to the skipping of the threads 24, 42. Thus, the skipping of the threads 24, 42 effectively manages some of the energy from the collision instead of all the energy being transferred to the pedestrian. The energy management characteristics of the bumper assembly 10 may also be adjusted as desired by changing the length of threaded engagement between the bumper 12 and the retainer 30 and/or changing the nominal size of the threads 24, 42. For example, it may be preferable for the threads 24, 42 to have a nominal size of about a standard M12 fastener. The length of threaded engagement may also preferably be about 5 threads to about 15 threads of engagement. In addition, the energy management characteristics may be tailored by tapering the minor diameter of the internal thread 42 or the major diameter of the external thread 24 or both. For example, the minor and/or major diameters may be tapered to increase the percentage of engagement as the bumper 12 moves down through the retainer 30. This would result in a lower initial impact force required to initiate skipping of the threads 24, 42 but increase the additional force required to continue skipping the threads 24, 42. The energy management characteristics may also be adjusted by changing the material of the threads 24, 42.

Turning to FIGS. 4-5B, and FIGS. 2-3C, another embodiment of a hood bumper assembly 44 is shown. The bumper assembly 44 is similar to the bumper assembly 10 of FIG. 1, except the retainer 46 is made up of an outer sleeve 30 and an inner sleeve 48. Alternatively, the retainer may be considered the outer sleeve 30 and the bumper may be considered the bumper 12 and the inner sleeve 48. Thus, the bumper 12 may be the same or similar to the bumper 12 described above, and the outer sleeve 30 may be the same or similar to the single piece retainer 30 described above. The inner sleeve 48 is preferably made from a plastic polymer material. The inner sleeve 48 may have an axial opening 50 extending through the inner sleeve 48. Internal threads 52 may be provided along the opening 50 for threadable engagement with the threads 24 on the bumper 12. The inner sleeve 48 may also have external threads 54 on the external surface of the inner sleeve 48 for threadable engagement with the threads 42 in the outer sleeve 30. At the top of the inner sleeve 48, the inner sleeve 48 may have a flange 56 with side wrenching surfaces 58 and a flat top surface 60.

Like the bumper assembly 10 of FIG. 1, the threads 24, 52 of the bumper 12 and the inner sleeve 48 and/or the threads 54, 42 of the inner sleeve 48 and the outer sleeve 30 have a percentage of thread engagement that is less than industry standards. This allows one or both of the threaded engagements to skip when an impact load is applied to the bumper assembly 44 without substantially deforming the threads 24, 52, 54, 42. For example, the percentage of threaded engagement between the bumper thread 24 and the inner sleeve thread 52 and/or the threaded engagement between the inner sleeve thread 54 and the outer sleeve thread 42 is preferably about 30% to about 50%. This may be accomplished by reducing one or both of the major diameters of the external threads 24, 54 and/or increasing one or both of the minor diameters of the internal threads 52, 42.

One difference between the embodiment of FIG. 4 and FIG. 1 is that the FIG. 4 bumper assembly 44 may provide two distinct stages of energy management. In other words, the threaded engagement between the bumper 12 and the inner sleeve 48 may require one impact load to skip the threads 24, 52, and the threaded engagement between the inner sleeve 48 and the outer sleeve 30 may require a different impact load to skip the threads 54, 42. This may be desirable if an energy management profile is desired with a lower impact first stage and a higher impact second stage. For example, the impact load required to skip the outer sleeve thread 42 and inner sleeve thread 54 may be higher than the impact load required to skip the inner sleeve thread 52 and the bumper thread 24. Thus, the outer and inner sleeve threads 42, 54 would not skip until after the inner sleeve and bumper threads 52, 24 have skipped a certain amount. For example, the inner sleeve and bumper threads 52, 24 could initially skip until the top bumper flange 20 contacts the top surface 60 of the inner sleeve flange 56. At that point, the impact load would be transferred to the outer and inner sleeve threads 42, 54. Different energy management stages may be accomplished by having a nominal thread diameter for the outer and inner sleeve threads 42, 54 that is larger than the inner sleeve and bumper threads 52, 24. For example, the outer and inner sleeve threads 42, 54 may have a nominal size of about a standard M14 fastener, and the inner sleeve and bumper threads 52, 24 may have a nominal size of about a standard M12 fastener. As described above, the energy management characteristics may also be adjusted for one or both of the threaded engagements by changing the length of threaded engagement, the nominal size of the threads, tapering the threads, and the material that the threads are made from.

The double threaded arrangement of FIG. 4 may also provide greater height adjustment if this feature is desired. For example, the height of the top surface 14 of the cushion 16 may be adjusted by rotating the bumper 12 and the inner sleeve 48 relative to each other. This may be accomplished by restraining the wrenching surfaces 58 on the inner sleeve 48 and turning the bumper 12. In addition, the inner sleeve 48 and the outer sleeve 30 may be rotated relative to each other to gain further height adjustment. This may be accomplished by turning the wrenching surfaces 58 on the inner sleeve 48 while the outer sleeve 30 is retained within the vehicle frame hole.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:

1. A bumper assembly for a vehicle hood, comprising:
   a retainer adapted to be attached to a vehicle frame, said retainer comprising a first thread;
   a bumper comprising a bumper surface adapted to contact a bottom surface of a vehicle hood to thereby support the vehicle hood at a predetermined height, said bumper comprising a second thread;
   wherein said first thread and said second thread are threadably engaged with each other, relative motion between said first and second threads thereby adjusting said predetermined height of said vehicle hood, at least one of said first and second threads being made from a plastic polymer; and
   wherein a percentage of thread engagement between said first and second threads is between about 30% and about 50%, said first and second threads thereby being adapted to skip past each other without substantially deforming said first and second threads when an impact load is applied to said vehicle hood, said bumper surface thereby moving toward said vehicle frame to permit said vehicle hood to move below said predetermined height.

2. The bumper assembly according to claim 1, wherein a major diameter of said first and second threads is smaller or a minor diameter of said first and second threads is larger than an industry standard diameter, said major diameter and said minor diameter defining said percentage of thread engagement of about 30% to about 50%.

3. The bumper assembly according to claim 1, wherein both of said first and second threads are made from a plastic polymer.

4. The bumper assembly according to claim 1, wherein said retainer comprises a single member and an opening in said single member, said first thread being an internal thread in said opening, and said bumper comprises a post, said second thread being an external thread on said post.

5. The bumper assembly according to claim 4, wherein said post comprises a hollow interior cavity internal to said second thread.

6. The bumper assembly according to claim 1, wherein a major diameter of said first and second threads is smaller or a minor diameter of said first and second threads is larger than an industry standard diameter, said major diameter and said minor diameter defining said percentage of thread engagement of about 30% to about 50%, both of said first and second threads are made from a plastic polymer, and said retainer comprises a single member and an opening in said single member, said first thread being an internal thread in said opening, and said bumper comprises a post, said second thread being an external thread on said post.

7. The bumper assembly according to claim 6, wherein said post comprises a hollow interior cavity internal to said second thread.

8. The bumper assembly according to claim 1, wherein said retainer comprises a first member and a second member, said second member being adapted to be attached to said vehicle frame, said first thread being on said first member and said first member comprising a third thread, said second member comprising a fourth thread threadably engaged with said third thread, relative motion between said third and fourth threads thereby adjusting said predetermined height of said vehicle hood.

9. The bumper assembly according to claim 8, wherein at least one of said third and fourth threads is made from a plastic polymer, a percentage of thread engagement between said third and fourth threads is between about 30% and about 50%, said third and fourth threads thereby being adapted to skip past each other without substantially deforming said third and fourth threads when an impact load is applied to said vehicle hood, said bumper surface thereby moving toward said vehicle frame to permit said vehicle hood to move below said predetermined height, said impact load required to skip said third and fourth threads being higher than said impact load required to skip said first and second threads.

10. The bumper assembly according to claim 9, wherein a nominal thread diameter of said third and fourth threads is larger than a nominal thread diameter of said first and second threads.

11. The bumper assembly according to claim 8, wherein said first, second, third and fourth threads are made from a plastic polymer.

12. The bumper assembly according to claim 8, wherein said first member is an inner sleeve, said second member is an outer sleeve, and said bumper comprises a post, said second thread being an external thread on said post and said first thread being an internal thread through an opening in said inner sleeve, said third thread being an external thread on said inner sleeve and said fourth thread being an internal thread through an opening in said outer sleeve.

13. The bumper assembly according to claim 8, wherein a major diameter of said first and second threads is smaller or a minor diameter of said first and second threads is larger than an industry standard diameter, said major diameter and said minor diameter defining said percentage of thread engagement of about 30% to about 50%, and both of said first and second threads are made from a plastic polymer.

14. The bumper assembly according to claim 13, wherein a percentage of thread engagement between said third and fourth threads is between about 30% and about 50%, said third and fourth threads thereby being adapted to skip past each other without substantially deforming said third and fourth threads when an impact load is applied to said vehicle hood, said bumper surface thereby moving toward said vehicle frame to permit said vehicle hood to move below said predetermined height, said impact load required to skip said third and fourth threads being higher than said impact load required to skip said first and second threads, and both said third and fourth threads are made from a plastic polymer.

15. The bumper assembly according to claim 14, wherein a nominal thread diameter of said third and fourth threads is larger than a nominal thread diameter of said first and second threads.

16. The bumper assembly according to claim 15, wherein said first member is an inner sleeve, said second member is an outer sleeve, and said bumper comprises a post, said second thread being an external thread on said post and said first thread being an internal thread through an opening in said inner sleeve, said third thread being an external thread on said inner sleeve and said fourth thread being an internal thread through an opening in said outer sleeve.

17. The bumper assembly according to claim 16, wherein said post comprises a hollow interior cavity internal to said second thread.

18. The bumper assembly according to claim 1, wherein said first or second thread is tapered to increase said percentage of thread engagement as said first and second threads skip past each other, an initial impact load required to initiate skipping of said first and second threads thereby being less than an additional force required to continue skipping said first and second threads.

19. The bumper assembly according to claim 8, wherein said first or second thread is tapered to increase said percentage of thread engagement as said first and second threads skip past each other, an initial impact load required to initiate skipping of said first and second threads thereby being less than an additional force required to continue skipping said first and second threads.

20. The bumper assembly according to claim 9, wherein said first, second, third or fourth thread is tapered to increase said percentage of thread engagement as said first and second threads or said third and fourth threads skip past each other, an initial impact load required to initiate skipping of said first and second threads or said third and fourth threads thereby being less than an additional force required to continue skipping said first and second threads or said third and fourth threads.

\* \* \* \* \*